(12) United States Patent
Chin et al.

(10) Patent No.: US 6,343,077 B1
(45) Date of Patent: Jan. 29, 2002

(54) STACKABLE UTOPIA SWITCHING APPARATUS FOR A BROADBAND SWITCHING SYSTEM

(75) Inventors: Charles Changli Chin, Yung Kang; Jian-Cheng Li, San Chung; Dennis Cheng, Pan Chia, all of (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/365,769

(22) Filed: Aug. 3, 1999

(51) Int. Cl.[7] .............................................. H04L 12/56
(52) U.S. Cl. ........................................ 370/395; 370/413
(58) Field of Search ................................ 370/395–398, 370/231–238, 400–402, 412, 413; 328/258, 329, 462–466, 352, 474, 421; 710/129, 126, 128; 725/119, 129, 126; 485/397; 525/474, 342, 395, 509; 709/232–235

(56) References Cited

U.S. PATENT DOCUMENTS

| | | | | |
|---|---|---|---|---|
| 5,754,941 A | * | 5/1998 | Sharpe et al. | 725/119 |
| 5,809,025 A | * | 9/1998 | Timbs | 370/400 |
| 5,999,518 A | * | 12/1999 | Nattkemper et al. | 370/258 |
| 6,034,950 A | * | 3/2000 | Sauer et al. | 370/328 |
| 6,049,541 A | * | 4/2000 | Kerns et al. | 370/365 |
| 6,058,114 A | * | 5/2000 | Sethuram et al. | 370/397 |
| 6,081,519 A | * | 6/2000 | Petler | 370/356 |
| 6,157,614 A | * | 12/2000 | Pasternak et al. | 370/236 |

\* cited by examiner

Primary Examiner—Huy D. Vu
Assistant Examiner—Prenell Jones
(74) Attorney, Agent, or Firm—Nath&Associates PLLC; Harold L. Novick

(57) ABSTRACT

A stackable UTOPIA switching device for use in an Asynchronous Transfer Mode switch is provided to connect to more digital subscriber lines (DSL). The inventive UTOPIA switching device can work along or be arranged in a tree-like hierarchy to connect to more DSLs. The UTOPIA switching device comprises an Up-link end and a down-link end. The down-link end can connect to 31 slave multiplexers or physical layers at the most. The up-link end can connect to master USD or slave USD. Both the up-link end and the down-link end have three input queues and an output queue for storing the cells. The cells are stored in the input queues and the output queues according to the control of a priority queuing logic circuits.

18 Claims, 3 Drawing Sheets

STACKABLE UTOPIA SWITCHING APPARATUS FOR A BROADBAND SWITCHING SYSTEM

BACKGROUND OF THE INVENTION

A. Field of the Invention

The present invention relates to an UTOPIA switching device for a braodband switching system, especially to a stackable UTOPIA switching device (USD) for an ATM switch which can be arranged as a tree-like hierarchy for connecting to multiple digital subscriber lines (DSL).

B. Description of the Prior Art

With the advantages of high transmission speed and stable QoS, Asynchronous Transfer Mode (ATM) backbone has been a promising solution for high bandwidth transmission, such as asymmetrical digital subscriber line (ADSL) or Very high speed Digital Subscriber Line (VDSL). A conventional ATM switch 11 usually resides in a distribution point 10 of an ATM network system, such as a central office of a local telephone service provider, as illustrated in FIG. 1. The ATM switch 11 will transmit data to/from the user's terminal 15 via the ATM backbone 16 from/to the ATM networks 17. The user's terminal 15, usually referred to as customer premise equipment (CPE), has a point-to-point connection to the user's premises ADSL MODEM 13 via the twisted copper wire pair customer line 14. Each ADSL MODEM 13 has a point-to-point connection to a high speed digital port 12 of an ATM switch 11. Since a high speed digital port 12 of an ATM switch 11 is very expensive and each digital port 12 is dedicated to an ADSL line, it makes the entire ATM switch 11 very expensive.

Moreover, the architecture of an ATM switch 11 is based on a fully-connected topology or a bus-like topology. The switch circuit for supporting fully-connected topology is complicated and expensive, especially when the number of ADSL users increases. The current technology of a switch circuit for supporting bus-line topology, on the other hand, can connect to 16 ADSL lines at the most, which is not enough for a large network system.

SUMMARY OF THE INVENTION

Accordingly, it is a primary object of the present invention to provide a stackable UTOPIA Switching device for the ATM switch which is easy to implement and can be arranged in a tree-like hierarchy for connecting to multiple ADSL lines, thereby to reduce the cost of an ATM switch.

It is another object of the present invention to provide a stackable switching device for an ATM switch which can be easily adapted to devices that supports UTOPIA interfaces.

In accordance with the present invention, the preferred embodiment of the present invention mainly includes a stackable UTOPIA switching device for use in an Asynchronous Transfer Mode switch. The inventive UTOPIA switching device can be easily arranged in a tree-like hierarchy to connect to multiple ADSL lines. A single UTOPIA switching device can connect to 4 ADSL transceivers. The UTOPIA switching device comprises an Up-link end and a down-link end. The down-link end can connect to 31 slave multiplexers or physical layers at the most. The up-link end can connect to a master USD or a slave USD. Both the up-link end and the down-link end have three input queues and one output queue for buffering the ATM cells. The ATM cells are buffered in the three input queues and the output queues in an order controlled by a priority queuing logic circuit. Additionally, a translation RAM can be added for looking up a new VCI/VPI in a table to replace the VCI/VPI field in the header of the cells. With the stackable architecture and the simplicity in the circuit design, the cost on the hardware-level implementation of an ATM switch can be successfully reduced.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

The Universal Test and Operation PHY Interface for ATM (UTOPIA) specification defines the interface between the physical layer and upper layer ATM modules. UTOPIA provides a common functional interface for a wide range of speeds and media types. UTOPIA also provides interconnecting devices supporting ATM specifications ranging from sub-100 Mbps, 155 Mbps to 622 Mbps. For this reason, the switching device of the present invention is especially based on UTOPIA interface.

Figure 1:
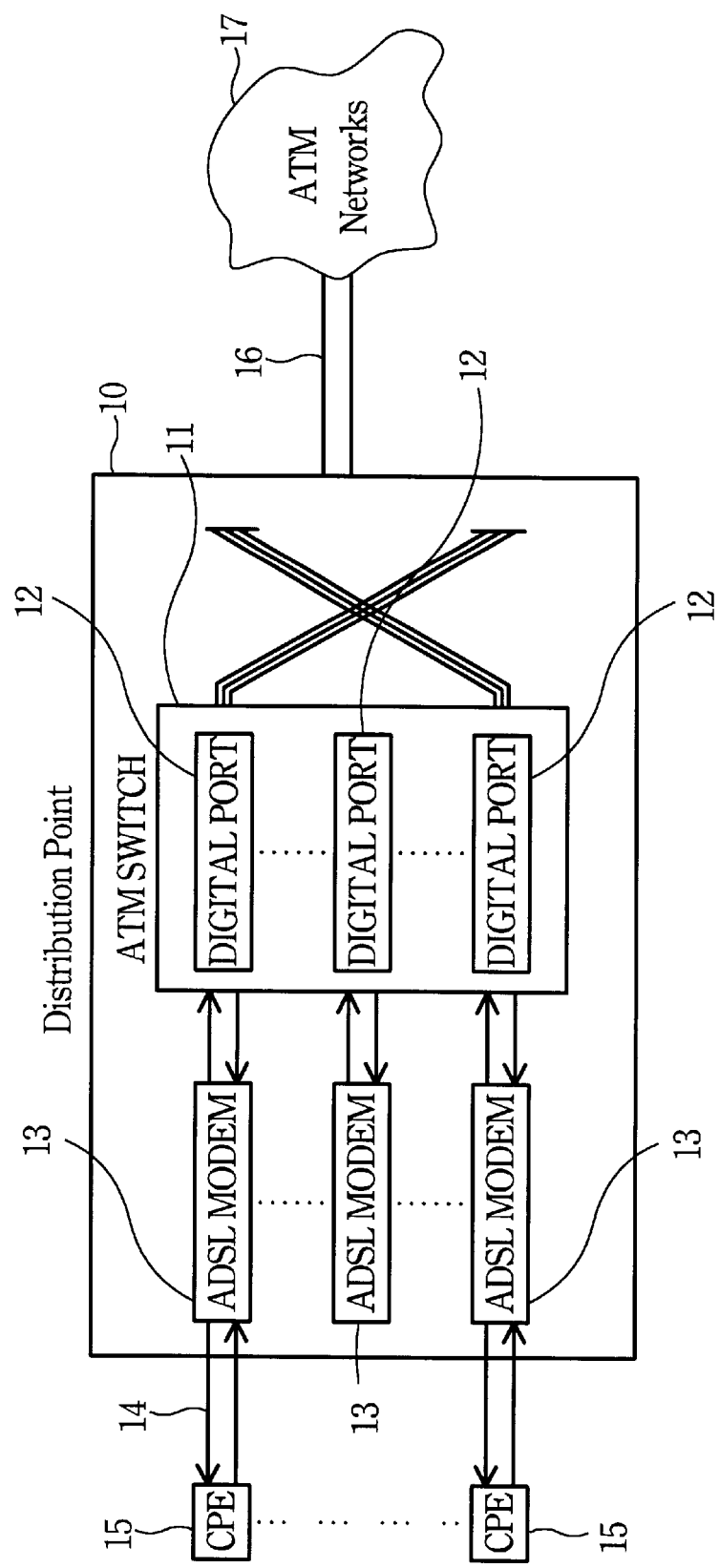
FIG. 1 is a block diagram showing a conventional ATM switch connecting to multiple asymmetric digital subscriber lines.
Figure 2:
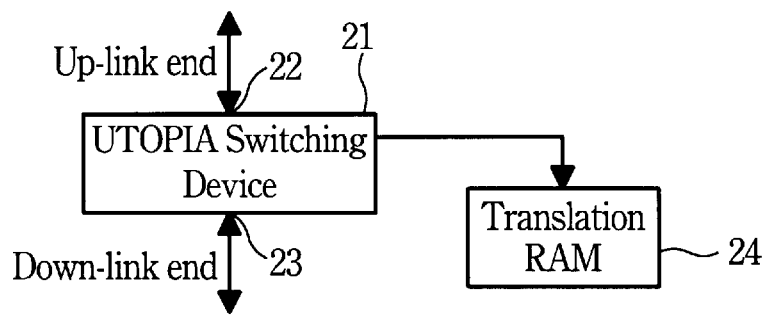
FIG. 2 is a block diagram showing the Input/output of a single UTOPIA Switching Device according to the present invention.
Figure 5:
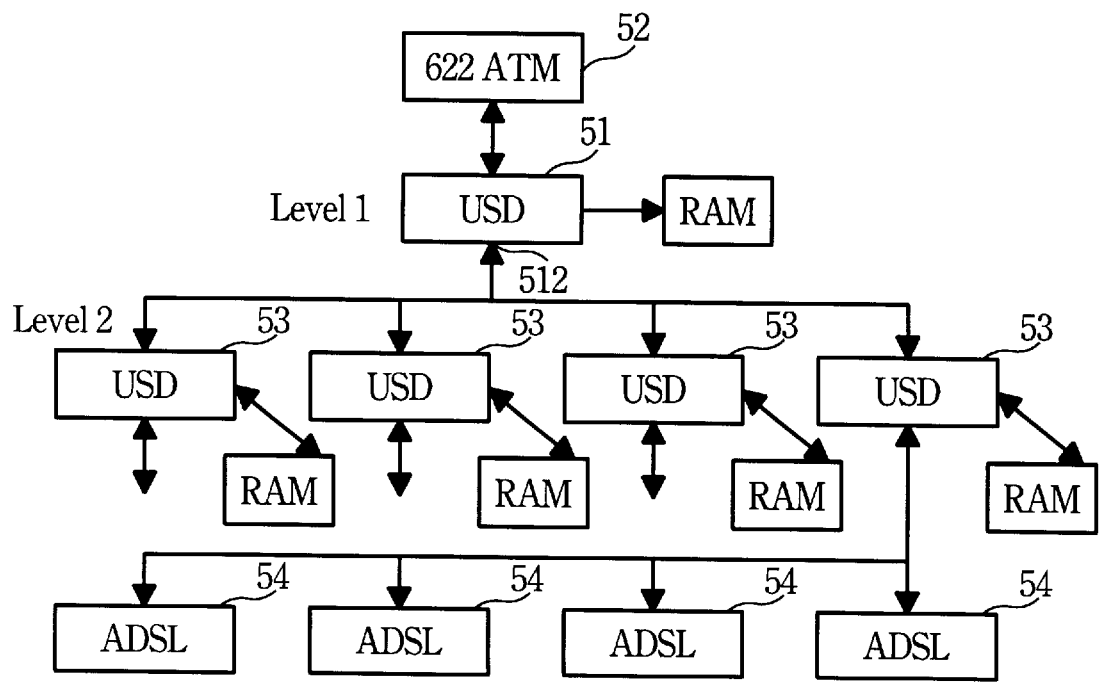
FIG. 5 is a block diagram showing an ATM switch uses two levels of UTOPIA Switching Devices to connect 16 ADSL lines according to the present invention.

Refer to FIG. 2 which shows the input/output of a UTOPIA Switching Device (USD) 21 according to the present invention. The USD 21 is a stackable device. It has two ends, an up-link end 22 and a down-link end 23. The up-link end is defined as the direction from the CPE to the ATM transceiver. The down-link end is defined as the direction from the ATM transceiver to the CPE. The USD 21 can be coupled to an ATM transceiver as a single device. The USD 21 may also be operated with other USDs and arranged in a tree-like hierarchy to provide Digital Subscriber line Access Multiplexer (DSLAM) functions as illustrated in FIG. 5. The USD 21 may be coupled to a Translation RAM 24 for looking up a translation table. The translation RAM 24 can store the configurations of the multiplexer and the translation table for Virtual Channel Interface/Virtual Path Interface (VCI/VPI). Each USD 21 follows UTOPIA 1 and UTOPIA 2 standards for interfacing between the physical layer of an ATM switch, an internetworking device, and also an USD. The transmission rate of the UTOPIA interface adopted by the inventive USD 21 can reach 25/50 MHz, and 32-bit of data transmission.

Each USD can be defined as either a master or a slave USD depending on whether its activity originates from itself or from others. An USD connected to another USD from its down-link end must be a master USD because it can connect to 31 slave multiplexers or physical layers at the most. On the other hand, an USD connected to another USD from its up-link end may be either a master USD or a slave USD. If it is a master USD, it can connect to one slave USD at the most.

Figure 3:
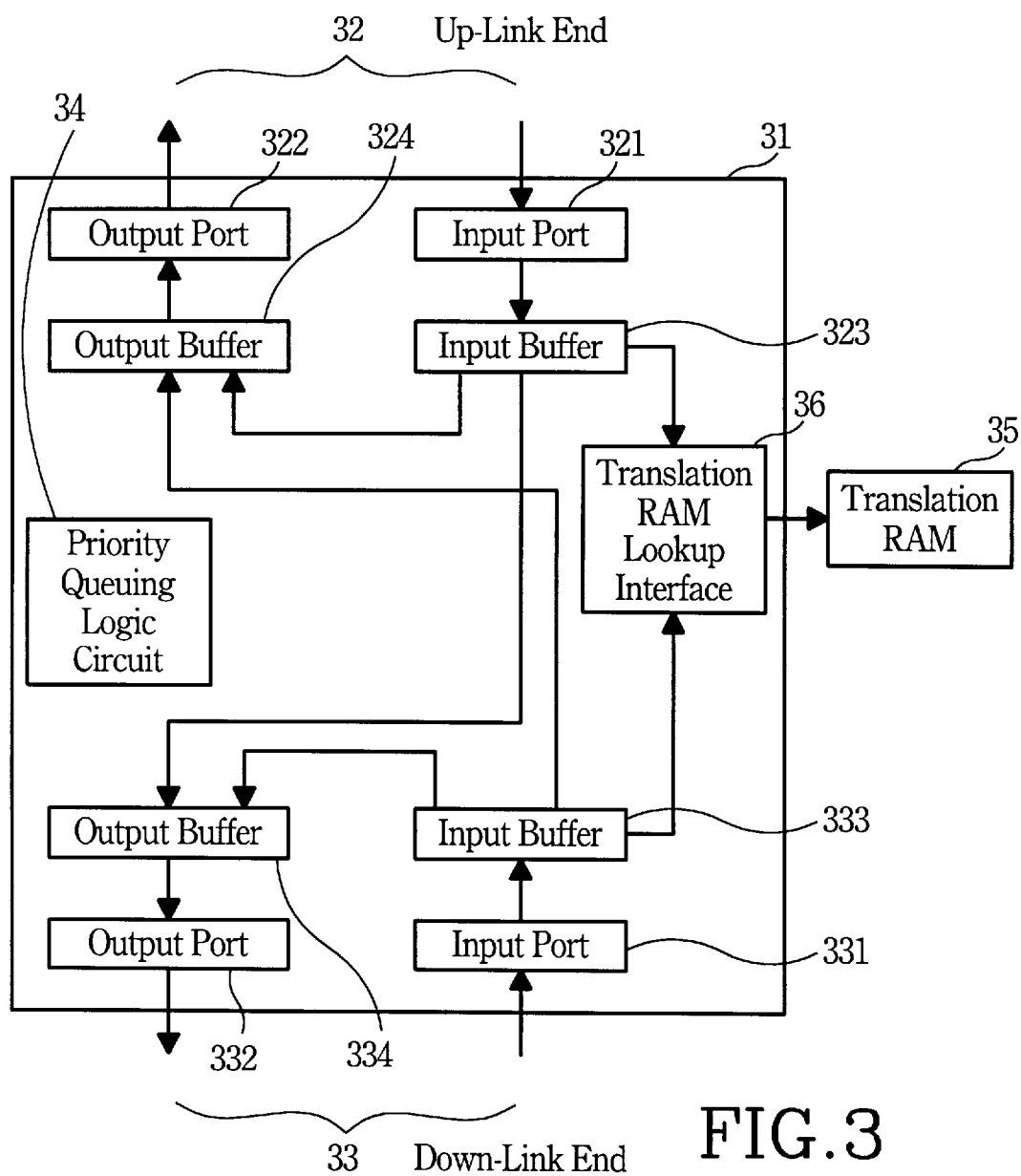
FIG. 3 is a block diagram showing the inner structure of a single UTOPIA Switching Device according to the present invention.

Refer to FIG. 3 for showing the inner structure of a USD. The up-link end 32 of the USD 31 has an input port 321 and an output port 322 that supports UTOPIA interface. The down-link end 33 of the USD 31 also has an input port 331 and an output port 332 that supports UTOPIA interface. Each input port 321, 331 and output port 322, 332 for the up-link end 32 and the down-link end 33 are operated independently so as to increase the transmission speed. Each input port 321, 331 and output port 322, 332 can be configured as 25 or 50 MHz respectively, for transmitting data of 8, 16 or 32 bits.

It is known that ATM networking depends on the establishment of virtual connections. An ATM virtual connection is a series of links between physical devices in a network. A virtual path is a group of virtual channels. Each virtual channel preserves cell sequence and is guaranteed to provide a specified data rate. ATM uses virtual channels and virtual paths for routing cells through such physical devices. Accordingly, an ATM cell is transmitted from a first USD to a second USD by following its virtual path identifier (VPI) and a virtual channel identifier (VCI). VPI and VCI are used to identify a logical channel preset between the first USD and the second USD. VCI and VPI are stored as channel identification information to a header portion of this ATM cell. If VCI/VPI conversion is required, its new VCI/VPI and output port can be found by looking up the translation table in the translation RAM 35 according to the VDI/VPI value in the header of each cell. Here, the output port refers to the output port of a specific USD of a specific level in the tree-like hierarchy. The output port will be stored in the header of the cell. By looking at the VPI and VCI of a cell, the ATM switch can determine to which port the cell should be routed. Before actually sending the cell, the ATM switch replaces the virtual channel number of the cell with that which will be needed at the next switch.

Each input port 321, 331 is coupled to an input buffer 323, 333 respectively. And each output port 322, 332 is coupled to an output buffer 324, 334 respectively. In each input buffer 323, 333, there are three input queues for storing incoming cells of CBR, VBR and ABR respectively. The incoming cells will be sent to the input buffer 323, 333, in an order determined by the Priority Queuing Logic circuit 34. The Priority Queuing Logic circuit 34 provides the cells of CBR with the first priority, then cells of VBR with the second priority, and the cells of ABR with the last priority. Accordingly, whenever there is an incoming cell in the CBR queue of input buffer 323 of the up-link end 32, the incoming cell of CBR will be moved to the output queue of the output buffer 322 or 334, depending on the destination address of the incoming cell. Then, the Priority Queuing Logic circuit 34 checks the input buffer 333 of the downlink end 33 to see if there is any incoming cell of CBR. If there is any, the incoming cell will be moved to the output queue of the output buffer 322 or 334, depending on the destination address of the incoming cell. The same scenario continues for transferring the incoming cells in the VBR queues and the ABR queues. However, each output buffer 324, 334 has only one output queue for buffering outgoing cells. The cells in the output queues of the down-link end 33 and up-link end 32 will be transferred according to the UTOPIA standard.

Moreover, the input buffer 323, 333 can use the translation RAM Lookup Interface 36 for looking the VCI/VPI information in the translation table of the Translation RAM 35 when appropriate.

Figure 4:
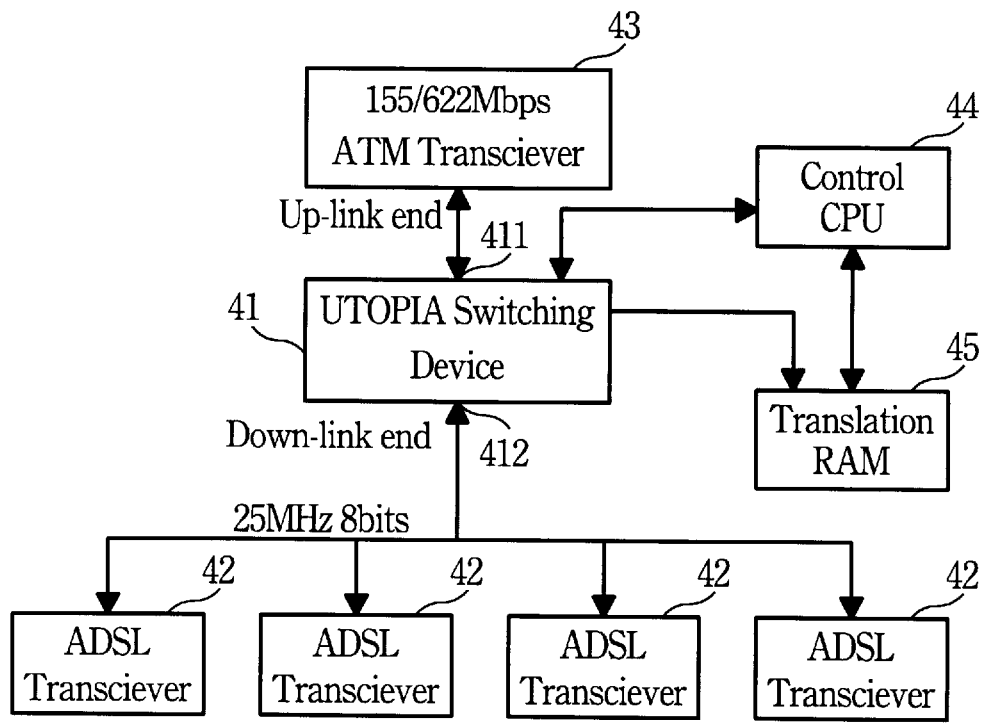
FIG. 4 is a block diagram showing an ATM switch uses a single UTOPIA Switching Device to connect 4 ADSL lines.

FIG. 4 shows an example for using a single USD 41 to connect 4 ADSL transceivers 42. Refer to FIG. 4, the USD 41 connects to an ATM switch of 155 or 622 Mbps 43 from its up-link end 411 and connects to 4 ADSL transceivers 42 from its down-link end 412. Each ADSL transceiver 42 can be implemented by directly using elements that support UTOPIA interfaces. The transmission speed of the I/O ports of the down-link end 412 can be implemented as 25 MHz for data of 8 bits. The control CPU 44 is responsible for building the translation table in the Translation RAM 45. When forwarding the incoming cells, the USD 41 will look up the translation table of the Translation RAM 45.

Since the USD 41 is stackable, the architecture as shown in FIG. 4 can be extended to a tree-like hierarchy as shown in FIG. 5. FIG. 5 shows USDs arranged in a two-level hierarchy. The first level is a single USD 51 which connects to an ATM transceiver 52 via its up-link end 511. The down-link end 512 of the USD 51 is connected to 4 USDs 53 of the second level. Each USD 53 in the second level connects to 4 ADSL transceivers 54. Consequently, the entire tree-like architecture allows 16 ADSL lines to connect to a 622 Mbps ATM transceiver. The two-level hierarchy is only an example. It can be further extended to three, and even more levels, so as to connect even more ADSL users.

A preferred embodiment has been described in detail hereinabove. It is to be understand that he scope of the invention also comprehends embodiments different from the one described, yet within the scope of the claims. For example, the speed of the ATM is not limited to 622 MHz. A new generation of ATM switch may be provided with even higher transmission speed yet still applicable to the structure of the inventive USD.

It should be understood that various alternatives to the structures described herein may be employed in practicing the present invention. It is intended that the following claims define the invention and that the structure within the scope of these claims and their equivalents be covered thereby.

What is claimed is:

1. A stackable UTOPIA switching apparatus for use in an Asynchronous Transfer Mode switch, comprising:

an up-link end for connecting to an UTOPIA interface device, said up-link end having an input port and an output port operated independently, and said input port having an input buffer for storing a plurality of input queues, said output port having an output buffer for storing a single output queue;

a down-link end for connecting to an UTOPIA interface device, said down-link end having an input port and an output port operated independently, and said input port having an input buffer for storing a plurality of input queues, said output port having an output buffer for storing a single output queue, said down-link end being able to connect to 31 slave multiplexers at the most when in master mode;

a priority queuing logic circuit coupling to said input buffers and said output buffers of said up-link end and said down-link end for controlling a priority sequence for forwarding each incoming cell; and memory lookup interface means coupled to said input buffer and said output buffer of said up-link end and of said down-link end for interfacing memory means.

2. The stackable UTOPIA switching apparatus as claimed in claim 1, wherein said priority sequence of said priority queuing logic circuit is to process each cell in a sequential order of CBR, VBR, and ABR.

3. The stackable UTOPIA switching apparatus as claimed in claim 1, wherein said UTOPIA interface device is an ATM switch.

4. The stackable UTOPIA switching apparatus as claimed in claim 1, wherein said UTOPIA interface device is a UTOPIA switching apparatus.

5. The stackable UTOPIA switching apparatus as claimed in claim 1, wherein an output port of an incoming cell is determined by its destination UTOPIA switching apparatus in a specific hierarchy.

6. The stackable UTOPIA switching apparatus as claimed in claim 1, wherein said up-link end can connect to one slave UTOPIA switching apparatus at the most when in master mode.

7. A stackable UTOPIA switching apparatus, utilized in an Asynchronous Transfer Mode switch, easy to be arranged in a tree-like hierarchy to connect a plurality of digital subscriber lines, comprising:

an up-link end for connecting to an UTOPIA interface device, said up-link end having an input port and an output port operated independently, and said input port having an input buffer for storing a plurality of input queues, said output port having an output buffer for storing a single output queue;

a down-link end for connecting to an UTOPIA interface device, said down-link end having an input port and an output port operated independently, and said input port having an input buffer for storing a plurality of input queues, said output port having an output buffer for storing a single output queue, said down-link end being able to connect to a plurality of digital subscriber lines; and a priority queuing logic circuit coupling to said input buffers and said output buffers of said up-link end and said down-link end for controlling a priority sequence for forwarding each incoming cell.

8. The stackable UTOPIA switching apparatus as claimed in claim 7, further comprising:

memory lookup interface means coupled to said input buffer and said output buffer of said up-link end and of said down-link end for interfacing memory means.

9. The stackable UTOPIA switching apparatus as claimed in claim 7, wherein said plurality of input queues of said up-link end are for storing cells of CBR, VBR, and ABR respectively.

10. The stackable UTOPIA switching apparatus as claimed in claim 7, wherein said plurality of input queues of said down-link end are for storing cells of CBR, VBR, and ABR respectively.

11. The stackable UTOPIA switching apparatus as claimed in claim 7, wherein said priority sequence of said queuing logic circuit is to process each cell in a sequential order of CBR, VBR, and ABR.

12. The stackable UTOPIA switching apparatus as claimed in claim 7, wherein said UTOPIA interface device is an ATM switch.

13. The stackable UTOPIA switching apparatus as claimed in claim 7, wherein said UTOPIA interface device is a UTOPIA switching device.

14. The stackable UTOPIA switching apparatus as claimed in claim 7, wherein an output port of an incoming cell is determined by its destination UTOPIA switching apparatus in a specific hierarchy.

15. The stackable UTOPIA switching apparatus as claimed in claim 7, wherein said plurality of digital subscriber lines are 4 asymmetric digital subscriber lines.

16. The stackable UTOPIA switching apparatus as claimed in claim 7, further comprising:

a central process unit for building a translation table; and memory means coupled to said central process unit for storing said translation table.

17. The stackable UTOPIA switching apparatus as claimed in claim 7, wherein said down-link end can connect to 31 slave multiplexers at the most when in master mode.

18. The stackable UTOPIA switching apparatus as claimed in claim 7, wherein said up-link end can connect to one slave UTOPIA switching apparatus at the most when in master mode.

* * * * *